(12) United States Patent
Liao

(10) Patent No.: US 9,236,020 B2
(45) Date of Patent: Jan. 12, 2016

(54) DISPLAY DEVICE AND METHOD THEREOF FOR DISPLAYING IMAGES

(71) Applicant: SHENZHEN CHINA STAR OPTOELECTRONICS TECHNOLOGY CO., LTD., Guangdong (CN)

(72) Inventor: Qiaosheng Liao, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 14/354,961

(22) PCT Filed: Mar. 13, 2014

(86) PCT No.: PCT/CN2014/073372
§ 371 (c)(1),
(2) Date: Apr. 29, 2014

(87) PCT Pub. No.: WO2015/135180
PCT Pub. Date: Sep. 17, 2015

(65) Prior Publication Data
US 2015/0262539 A1 Sep. 17, 2015

(30) Foreign Application Priority Data
Mar. 11, 2014 (CN) .......................... 2014 1 0087430

(51) Int. Cl.
G09G 3/36 (2006.01)
H04N 13/04 (2006.01)

(52) U.S. Cl.
CPC ......... *G09G 3/3648* (2013.01); *H04N 13/0454* (2013.01); *G09G 2300/0404* (2013.01); *G09G 2300/0426* (2013.01); *G09G 2300/0478* (2013.01)

(58) Field of Classification Search
CPC .................. G09G 3/3648; G09G 2300/0404; G09G 2300/0426; G09G 2300/0478; H04N 13/0454
See application file for complete search history.

(56) References Cited

U.S. PATENT DOCUMENTS

| | | | | |
|---|---|---|---|---|
| 8,451,407 B2* | 5/2013 | Jeong | ................ | G02F 1/133555 349/114 |
| 8,587,754 B2* | 11/2013 | Jeong | ................ | G02F 1/133555 349/114 |
| 8,730,224 B2* | 5/2014 | Lee | ......................... | G02B 27/26 345/211 |
| 8,913,109 B2* | 12/2014 | Hsiao | ................. | H04N 13/0422 345/419 |
| 9,049,436 B2* | 6/2015 | Kim | ...................... | G09G 3/003 |
| 9,070,336 B2* | 6/2015 | Chiang | ................ | G09G 3/3659 |
| 9,122,106 B2* | 9/2015 | Jung | ..................... | G02F 1/1343 |
| 2010/0328290 A1* | 12/2010 | Jeong | ................ | G02F 1/133555 345/211 |
| 2010/0328564 A1* | 12/2010 | Jeong | ................ | G02F 1/133555 349/39 |
| 2011/0128269 A1* | 6/2011 | Lee | ......................... | G02B 27/26 345/211 |
| 2013/0050815 A1* | 2/2013 | Fukushima | ............ | G02B 3/005 359/462 |
| 2013/0100108 A1* | 4/2013 | Chiang | ................ | G09G 3/3659 345/212 |
| 2013/0135293 A1* | 5/2013 | Kim | ...................... | G09G 3/003 345/419 |
| 2013/0335540 A1* | 12/2013 | Hsiao | ................. | H04N 13/0422 348/58 |

(Continued)

*Primary Examiner* — Lun-Yi Lao
*Assistant Examiner* — Peter D McLoone
(74) *Attorney, Agent, or Firm* — Hauptman Ham, LLP

(57) ABSTRACT

A display device includes a display panel and a lens plate covering the display panel. The display panel includes pixel units, and each pixel unit includes a first pixel portion and a second pixel portion. The first pixel portion includes a first switch and a slit indium tin oxide (ITO) connected to the first switch. The second pixel portion includes a second switch and a full ITO connected to the second switch.

19 Claims, 4 Drawing Sheets

(56) References Cited

U.S. PATENT DOCUMENTS

| | | | | |
|---|---|---|---|---|
| 2014/0035968 A1* | 2/2014 | Chen | ................ | G09G 5/02 345/691 |
| 2014/0104523 A1* | 4/2014 | Jung | ................ | G02F 1/1343 349/41 |
| 2015/0022510 A1* | 1/2015 | Yao | ................ | G09G 3/3659 345/211 |
| 2015/0154723 A1* | 6/2015 | Wu | ................ | G06T 1/00 345/522 |
| 2015/0185489 A1* | 7/2015 | Jin | ................ | H04N 13/00 359/463 |

\* cited by examiner

DISPLAY DEVICE AND METHOD THEREOF FOR DISPLAYING IMAGES

BACKGROUND OF THE INVENTION

1. Field of the Invention

The present invention relates to the field of display technology, and more particularly, to a display device and a related method for displaying images.

2. Description of the Prior Art

A conventional 3D (three dimension) display device comprises a display panel 11 and a lens plate 12. The lens plate 12 overlaps the display panel 11 to form an integration. The display panel 11 is used for producing images for left and right eyes. The lens plate 12 is used for transmitting light responding to images for the left eye to a user's left eye, and transmitting light responding to images for the right eye to the user's right eye.

The lens plate 12 comprises at least two string-shaped lenses 121. The at least two string-shaped lenses 121 are arranged in parallel. A straight line formed by the string-shaped lenses 121 is vertical to a pixel row 111 of the display panel 11. In other word, the straight line formed by the string-shaped lenses 121 is parallel to a pixel column of the display panel 11.

A black matrix (BM) layer is disposed between two adjacent pixels of the display panel 11. The BM layer comprises a plurality of spacer bars 112. The plurality of spacer bars 112 are parallel to or vertical to the pixel row 111. The plurality of spacer bars 112 are arranged in an equal distance, which forms a spacer bar array. The structural period of the spacer bar array is similar in a horizontal direction (the direction of the pixel row). A plurality of string-shaped lenses 121 arranged in an equal distance form a lens array. The structural period of the lens array is similar in a horizontal direction (the direction of the pixel row).

Inventors of the present invention discovered a problem occurring in the conventional technology when realizing the conventional technology. The problem is as follows:

When light passes through the BM layer and the lens plate 12, optical interference happens in the horizontal direction. Due to the optical interference, there are Moire stripes in zones of observance. The Moire stripes are black and white stripes. Display quality of the display device is not good due to the appearance of the Moire stripes.

Therefore, it is advisory to propose a new technical plan for solving the above-mentioned technological problem.

SUMMARY OF THE INVENTION

An object of the present invention is to provide a display device and a related method for displaying images to prevent the occurrence of the Moire stripes and to improve display quality of the display device.

According to the present invention, a display device, comprises: a display panel, comprising a thin film transistor (TFT) array substrate, a color filter substrate, and a liquid crystal layer, wherein the TFT array substrate comprises: at least one pixel unit, the pixel unit comprising a first pixel portion and a second pixel portion, the first pixel portion comprising a first switch and a slit indium tin oxide (ITO), the first switch being connected to the slit ITO, the second pixel portion comprising a second switch and a full ITO, and the second switch being connected to the full ITO; at least one first scan line, the first scan line being connected to the first switch, the at least one first scan line being used for transmitting a first scanning signal to the first switch to control a first current passage between the slit ITO and a data line to be turned on or turned off; and at least one second scan line, the at least one second scan line being connected to the second switch, the second scan line being used for transmitting a second scanning signal to the second switch to control a second current passage between the full ITO and the data line to be turned on or turned off; and a lens plate, covering the display panel. The first switch is used for turning on the first current passage when the display device is on a 2D mode to allow 2D image data to be transmitted to the slit ITO, and is used for turning off the first current passage when the display device is on a 3D mode to prevent 3D image data from being transmitted to the slit ITO. The second switch is used for turning off the second current passage when the display device is on the 2D mode to prevent the 2D image data from being transmitted to the full ITO, and is used for turning on the second current passage when the display device is on the 3D mode to allow the 3D image data to be transmitted to the full ITO.

In one aspect of the present invention, the lens plate comprises: a lens array, comprising at least two string-shaped lenses, the at least two string-shaped lenses being disposed in parallel, and a straight line formed by the string-shaped lenses and a line formed by the first pixel portion and the second pixel portion forming an angle.

In another aspect of the present invention, the angle ranges from 10 to 80 degrees.

In another aspect of the present invention, the angle ranges from 20 to 70 degrees.

In another aspect of the present invention, the full ITO comprises a first block electrode.

In still another aspect of the present invention, the ratio of the area of the first block electrode to the area of the second pixel portion ranges from 0.6 to 0.98.

In yet another aspect of the present invention, The full ITO comprises at least two second block electrodes, the two neighboring second block electrodes are connected, and the at least two second block electrodes are arranged in arrays.

According to the present invention, a display device, comprises: a display panel, comprising a thin film transistor (TFT) array substrate, a color filter substrate, and a liquid crystal layer, wherein the TFT array substrate comprises: at least one pixel unit, the pixel unit comprising a first pixel portion and a second pixel portion, the first pixel portion comprising a first switch and a slit indium tin oxide (ITO), the first switch being connected to the slit ITO, the second pixel portion comprising a second switch and a full ITO, and the second switch being connected to the full ITO; at least one first scan line, the first scan line being connected to the first switch, the at least one first scan line being used for transmitting a first scanning signal to the first switch to control a first current passage between the slit ITO and a data line to be turned on or turned off; and at least one second scan line, the at least one second scan line being connected to the second switch, the second scan line being used for transmitting a second scanning signal to the second switch to control a second current passage between the full ITO and the data line to be turned on or turned off; and a lens plate, covering the display panel.

In one aspect of the present invention, the first switch is used for turning on the first current passage when the display device is on a 2D mode to allow 2D image data to be transmitted to the slit ITO;

the second switch is used for turning off the second current passage when the display device is on the 2D mode to prevent the 2D image data from being transmitted to the full ITO.

In another aspect of the present invention, the first switch is used for turning off the first current passage when the display device is on a 3D mode to prevent 3D image data from being transmitted to the slit ITO. The second switch is used for turning on the second current passage when the display device is on the 3D mode to allow the 3D image data to be transmitted to the full ITO.

In another aspect of the present invention, the lens plate comprises: a lens array, comprising at least two string-shaped lenses, the at least two string-shaped lenses being disposed in parallel, and a straight line formed by the string-shaped lenses and a line formed by the first pixel portion and the second pixel portion forming an angle.

In another aspect of the present invention, the angle ranges from 10 to 80 degrees.

In another aspect of the present invention, the angle ranges from 20 to 70 degrees.

In another aspect of the present invention, the full ITO comprises a first block electrode.

In another aspect of the present invention, the ratio of the area of the first block electrode to the area of the second pixel portion ranges from 0.6 to 0.98.

In another aspect of the present invention, The full ITO comprises at least two second block electrodes, the two neighboring second block electrodes are connected, and the at least two second block electrodes are arranged in arrays.

17. A method using the display device as claimed in claim 1 for displaying images, comprising:

the first scan line transmitting the first scanning signal to the first switch to control the first current passage between the slit ITO and the data line to be turned on or turned off; and the second scan line transmitting the second scanning signal to the second switch to control the second current passage between the full ITO and the data line to be turned on or turned off.

In another aspect of the present invention, the first switch turns on the first current passage when the display device is on a 2D mode to allow 2D image data to be transmitted to the slit ITO. The second switch turns off the second current passage when the display device is on the 2D mode to prevent the 2D image data from being transmitted to the full ITO.

In another aspect of the present invention, the first switch turns off the first current passage when the display device is on a 3D mode to prevent 3D image data from being transmitted to the slit ITO. The second switch is used for turns on the second current passage when the display device is on the 3D mode to allow the 3D image data to be transmitted to the full ITO.

In contrast to prior art, no bright and dark stripes appear on the second pixel portion in the present invention, so the optical interference does not happen between the second pixel portion and the lens array. Besides, unlike the string-shaped lens comprising sloping spacer bars, the Moire stripes do not appear on the display device on a 3D mode because of slit ITOs (tin-doped indium oxides). The display quality of the display device is improved.

These and other features, aspects and advantages of the present disclosure will become understood with reference to the following description, appended claims and accompanying figures.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
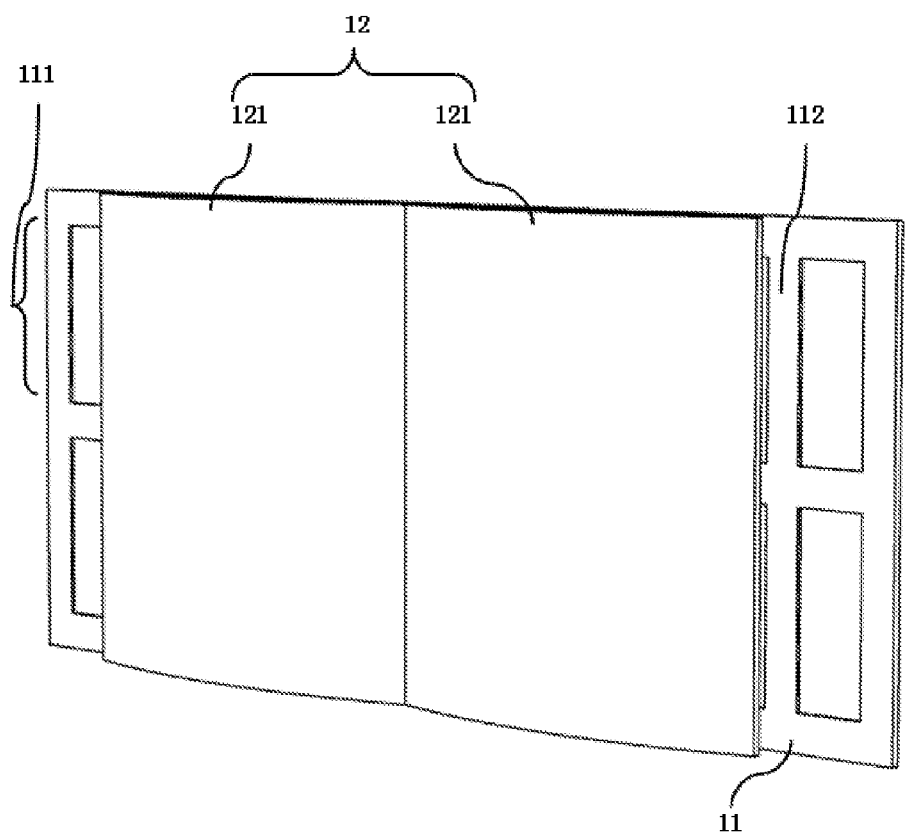
FIG. 1 shows a conventional 3D display device.
Figure 2:
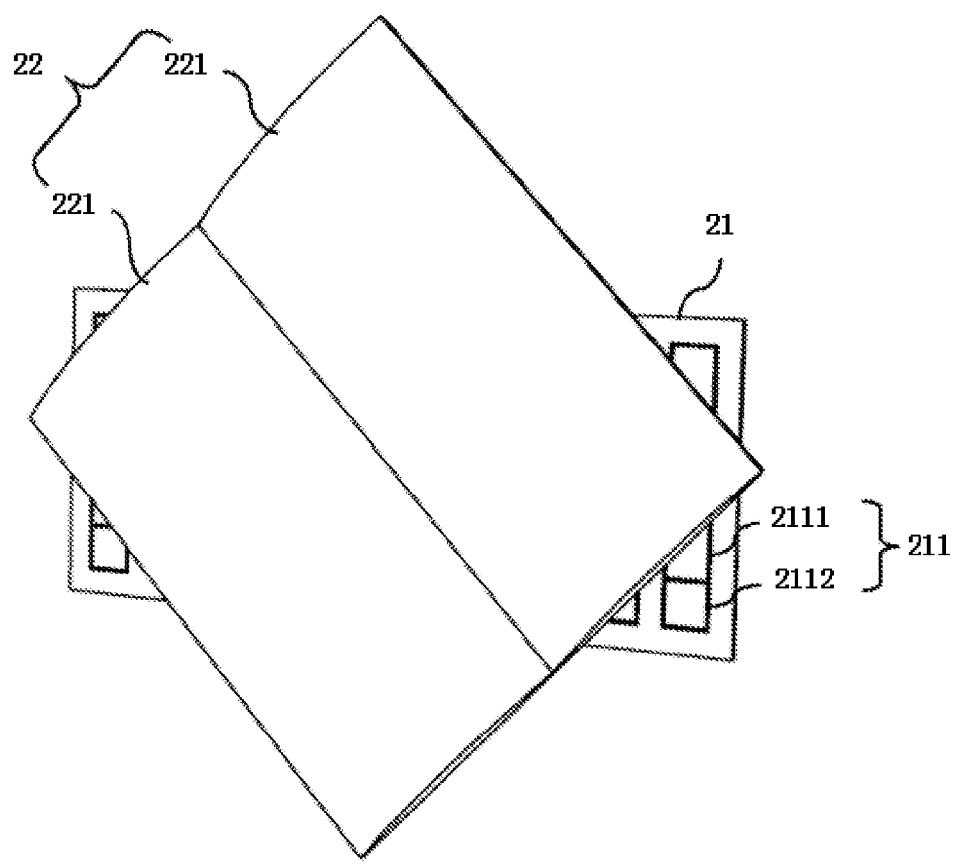
FIG. 2 is a schematic diagram showing a display device according to a first embodiment of the present invention.
Figure 3:
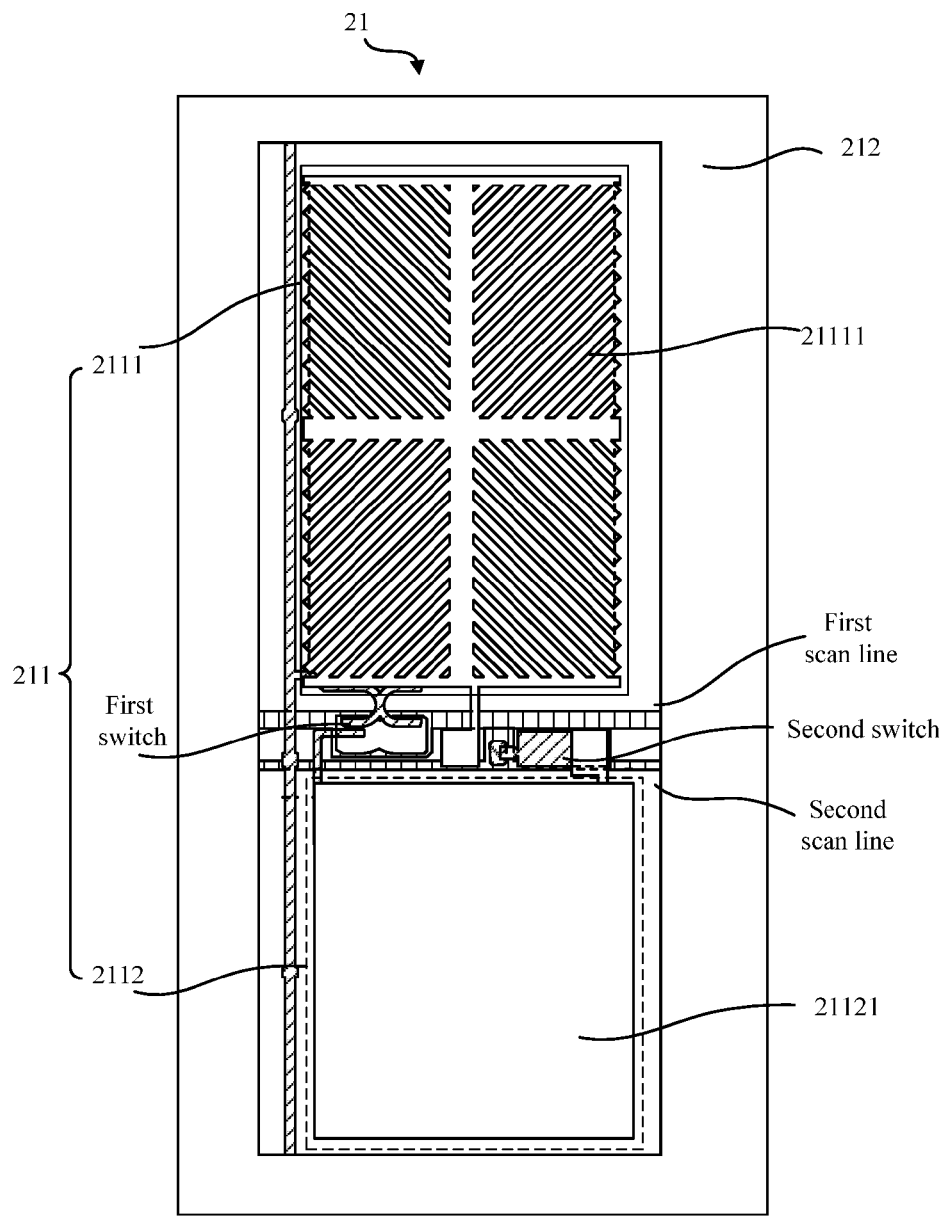
FIG. 3 is a schematic diagram showing a pixel unit of the display device shown in FIG. 2.
Figure 4:
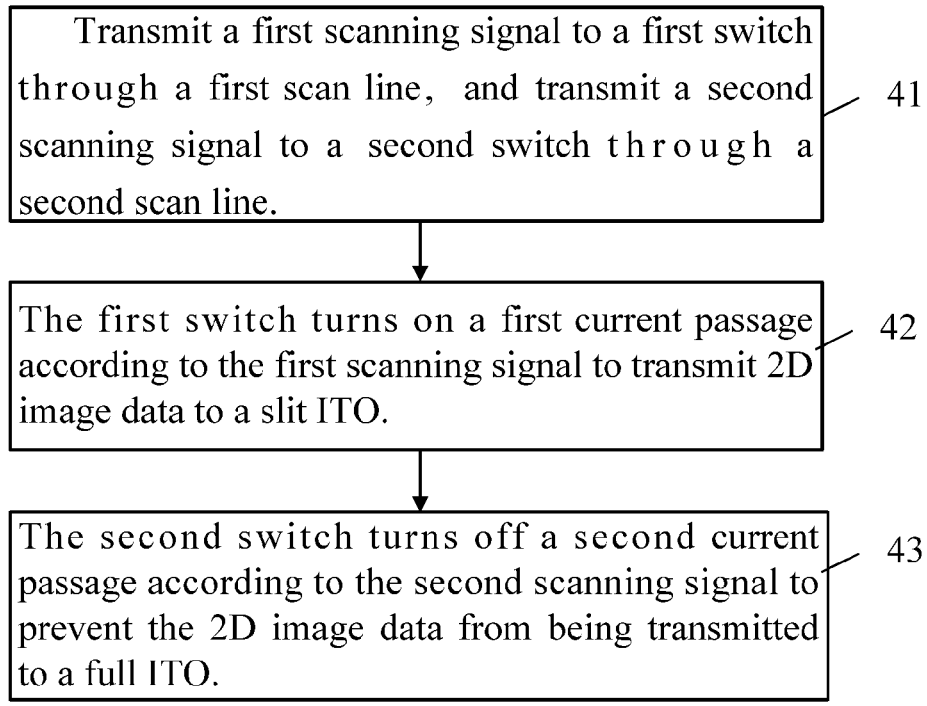
FIG. 4 shows a flowchart of a method of using the display device to display image under a 2D mode.
Figure 5:
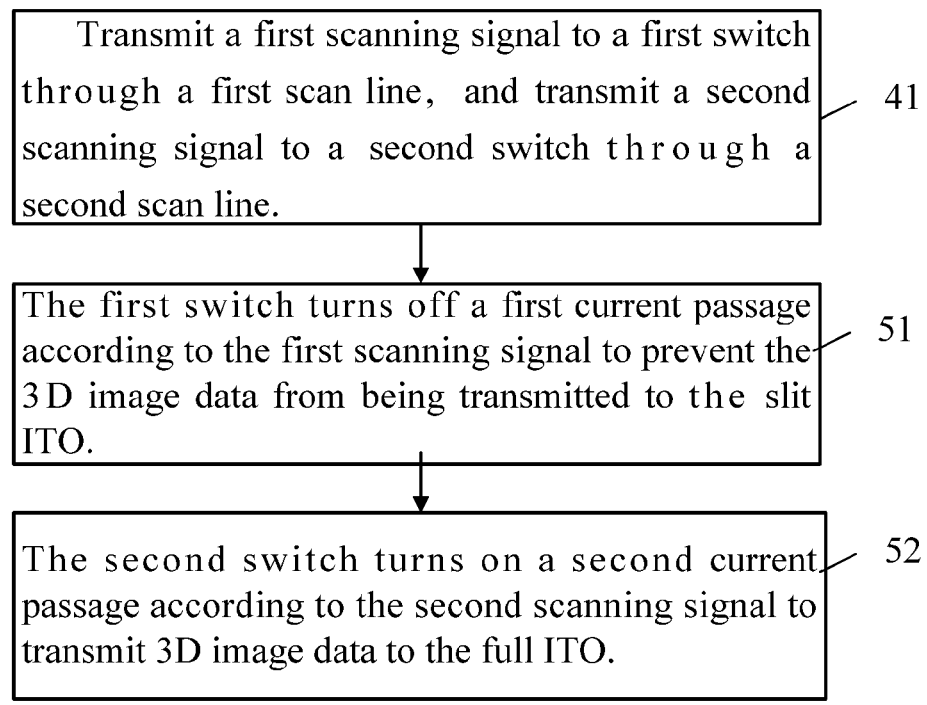
FIG. 5 shows a flowchart of a method of using the display device to display image under a 3D mode.

Please refer to FIG. 2 and FIG. 3. FIG. 2 is a schematic diagram showing a display device according to a first embodiment of the present invention. FIG. 3 is a schematic diagram showing a pixel unit 211 of the display device shown in FIG. 2.

The display device comprises a display panel 21 and a lens plate 22. The lens plate 22 overlaps the display panel 21 to form an integration. Specifically, the lens plate 22 is disposed on one side of a color filter substrate which is back on the liquid crystal layer. The display panel 21 comprises a thin film transistor (TFT) array substrate 212, a color filter substrate, and a liquid crystal layer. The TFT array substrate 212 is parallel to the color filter substrate. The liquid crystal layer is disposed between the TFT array substrate 212 and the color filter substrate.

The TFT array substrate 212 comprises at least two pixel row units and at least two data lines. The at least two pixel row units are arranged in columns The at least two data lines are arranged in rows. A pixel row unit comprises at least one pixel unit 211, at least one first scan line, and at least one second scan line. In the pixel row unit, the at least one pixel unit 211 is arranged in rows. Both of the first scan line and the second scan line are connected to the pixel unit 211. The data line is connected to the pixel unit 211 in the same column.

A BM layer is disposed on the color filter substrate. The BM layer comprises at least two spacer bars. A spacer bar is disposed on the periphery of the pixel unit 211. A straight line formed by the spacer bar is parallel to or vertical to a straight line formed by the pixel row unit. The at least two spacer bars form equally spaced spacer bar arrays in a direction in parallel to or in perpendicular to a direction where the pixel row unit is.

The pixel unit 211 comprises a first pixel portion 2111 and a second pixel portion 2112. The first pixel portion 2111 is adjacent to the second pixel portion 2112. A line which the first pixel portion 2111 and the second pixel portion 2112 form is in parallel to or in perpendicular to a straight line formed by the data line. As FIG. 2 shows, the present embodiment of the present invention is based on the condition that the line formed by the first pixel portion 2111 and the second pixel portion 2112 is parallel to the straight line formed by the data line. The first pixel portion 2111 comprises a first switch and a slit ITO (indium tin oxide) 21111. The first switch is connected to the slit ITO 21111, the data line, and the first scan line. A first scanning signal is transmitted to the first switch through the first scan line to control a first current passage between the slit ITO 21111 and the data line to be turned on or turned off. The second pixel portion 2112 comprises a second switch and a full ITO 21121. The second switch is connected to the full ITO 21121, the data line, and the second scan line. A second scanning signal is transmitted to the second switch through the second scan line to control a second current passage between the full ITO 21121 and the data line to be turned on or turned off. The first switch and the second switch can be on opposite conditions at the same time or during the same period. In other words, the first switch is switched on while the second switch is switched off. The first switch is switched off while the second switch is switched on. Both of the first switch and the second switch can be triodes such as TFTs.

In the present embodiment, the lens plate comprises a lens array. The lens array comprises at least two string-shaped lenses 221. The at least two string-shaped lenses 221 are disposed in parallel in a first direction. The first direction is perpendicular to a straight line formed by the string-shaped lenses 221. The straight line formed by the string-shaped lenses 221 and the line formed by the first pixel portion 2111 and the second pixel portion 2112 form an angle. The angle ranges from 10 to 80 degrees. For example, the angle is 10, 14, 17, 19, 21, 23, 26, 29, 31, 34, 36, 38, 40, 43, 45, 47, 50, 52, 55, 57, 59, 62, 66, 67, 69, 71, 73, 76, 78 or 80 degrees. Every two arbitrary neighboring string-shaped lenses 221 are equally spaced. The structural period of the lens array is similar in the first direction.

The full ITO 21121 comprises a first block electrode in the present embodiment. The ratio of the area of the first block electrode to the area of the second pixel portion 2112 ranges from 0.6 to 0.98. For example, the ratio is 0.6, 0.62, 0.65, 0.66, 0.68, 0.70, 0.73, 0.76, 0.77, 0.79, 0.82, 0.84, 0.85, 0.87, 0.89, 0.91, 0.94, 0.96, 0.97, or 0.98.

The display device also comprises a controller in the present embodiment. The controller is used for switching a display mode of the display device. The display mode is divided into a 2D mode and a 3D mode. In other words, the controller of the display device is used for converting the 2D mode into the 3D mode and converting the 3D mode into the 2D mode.

When the 2D mode becomes the 3D mode, the controller of the display device emits the first scanning signal to the first switch through the first scan line for turning off the first switch and emits the second scanning signal to the second switch through the second scan line for turning on the second switch. In the present embodiment, the first switch is used for turning off the first current passage when the display device is on the 3D mode for preventing 3D image data from being transmitted to the slit ITO 21111. The second switch is used for turning on the second current passage when the display device is on the 3D mode for allowing the 3D image data to be transmitted to the full ITO 21121.

When the 3D mode becomes the 2D mode, the controller of the display device emits the first scanning signal to the first switch through the first scan line for turning on the first switch and emits the second scanning signal to the second switch through the second scan line for turning off the second switch. In the present embodiment, the first switch is used for turning on the first current passage when the display device is on the 2D mode for allowing 2D image data to be transmitted to the slit ITO 21111. The second switch is used for turning off the second current passage when the display device is on the 2D mode for preventing the 2D image data from being transmitted to the full ITO 21121.

The at least two string-shaped lenses 221 of the lens plate 22 are arranged in the first direction. The first direction is perpendicular to the straight line formed by the string-shaped lenses 221. The straight line formed by the string-shaped lenses 221 and the line formed by the first pixel portion 2111 and the second pixel portion 2112 form an angle. The angle ranges from 10 to 80 degrees. The alignment of the spacer bar arrays is parallel to or vertical to the line formed by the first pixel portion 2111 and the second pixel portion 2112. When the display device is on the 3D mode, the optical interference does not occur after light passes through the display panel 21 and the lens plate 22. Thus, the Moire stripes do not appear, and the display quality of the display device is improved.

In addition, the full ITO 21121 is disposed in the second pixel portion 2112 to prevent the straight line formed by the slit ITO 21111 from being parallel to the straight line formed by the string-shaped lenses 221 so as to avoid the optical interference. The bright and dark stripes do not appear on the second pixel portion 2112, so the optical interference does not happen between the second pixel portion 2112 and the lens array. Moreover, unlike the string-shaped lenses 221 comprising sloping spacer bars, the Moire stripes do not appear on the display device on the 3D mode because of the slit ITO 21111. The display quality of the display device is improved.

There is a second embodiment in the present invention. The second embodiment is the same as the first embodiment except for some points as follows.

A full ITO 21121 comprises at least two second block electrodes. The two neighboring second block electrodes are connected. The at least two second block electrodes are arranged in arrays. The at least two second block electrodes are jointed to form the full ITO 21121. A second block electrode can be diamond, triangular, rectangular, quadrilateral, trapezoidal, circular, or hexagonal, in shape.

Since the full ITO 21121 is formed by jointing the at least two second block electrodes, bright and dark stripes do not appear on a second pixel portion 2112. The optical interference does not happen between an array to which a slit ITO corresponds and a lens array. Therefore, the Moire stripes do not occur, and the display quality of the display device is improved.

The present invention proposes a method for displaying images on the display device. The method comprises following steps:

Step 41: The first scanning signal is transmitted to the first switch through the first scan line to control the first current passage between the slit ITO 21111 and the data line to be turned on or turned off. The second scanning signal is transmitted to the second switch through the second scan line to control the second current passage between the full ITO 21121 and the data line to be turned on or turned off. Specifically, when the display device is on the 2D mode, the first scanning signal turns on the first switch, and the second scanning signal turns off the second switch. Correspondingly, when the display device is on the 3D mode, the first scanning signal turns off the first switch, and the second scanning signal turns on the second switch.

Step 42: When the display device is on the 2D mode, the first current passage is turned on by turning on the first switch to allow the 2D image data to be transmitted to the slit ITO 21111.

Step 43: When the display device is on the 2D mode, the second current passage is turned off by turning off the second switch to prevent the 2D image data from being transmitted to the full ITO 21121.

Step 51: When the display device is on the 3D mode, the first current passage is turned off by turning off the first switch to prevent the 3D image data from being transmitted to the slit ITO 21111.

Step 52: When the display device is on the 3D mode, the second current passage is turned on by turning on the second switch to allow the 3D image data to be transmitted to the full ITO 21121.

Step 42 and Step 43 can be operated simultaneously or can be operated in order. For example, Step 42 is followed by Step 43. Or, Step 43 is followed by Step 42. Likewise, Step 51 and Step 52 can be operated simultaneously or can be operated in order. For example, Step 51 is followed by Step 52. Or, Step 52 is followed by Step 51.

While the present invention has been described in connection with what is considered the most practical and preferred embodiments, it is understood that this invention is not limited to the disclosed off embodiments but is intended to cover various arrangements made without departing from the scope of the broadest interpretation of the appended claims.

What is claimed is:

1. A display device, comprising:
   a display panel, comprising a thin film transistor (TFT) array substrate, a color filter substrate, and a liquid crystal layer, wherein the TFT array substrate comprises:
   at least one pixel unit, the pixel unit comprising a first pixel portion and a second pixel portion, the first pixel portion comprising a first switch and a slit indium tin oxide (ITO), the first switch being connected to the slit ITO, the second pixel portion comprising a second switch and a full ITO, and the second switch being connected to the full ITO;
   at least one first scan line, the first scan line being connected to the first switch, the at least one first scan line being used for transmitting a first scanning signal to the first switch to control a first current passage between the slit ITO and a data line to be turned on or turned off; and
   at least one second scan line, the at least one second scan line being connected to the second switch, the second scan line being used for transmitting a second scanning signal to the second switch to control a second current passage between the full ITO and the data line to be turned on or turned off; and
   a lens plate, covering the display panel;
   the first switch being used for turning on the first current passage when the display device is on a 2D mode to allow 2D image data to be transmitted to the slit ITO, and being used for turning off the first current passage when the display device is on a 3D mode to prevent 3D image data from being transmitted to the slit ITO;
   the second switch being used for turning off the second current passage when the display device is on the 2D mode to prevent the 2D image data from being transmitted to the full ITO, and being used for turning on the second current passage when the display device is on the 3D mode to allow the 3D image data to be transmitted to the full ITO.

2. The display device as claimed in claim 1, wherein the lens plate comprises:
   a lens array, comprising at least two string-shaped lenses, the at least two string-shaped lenses being disposed in parallel, and a straight line formed by the string-shaped lenses and a line formed by the first pixel portion and the second pixel portion forming an angle.

3. The display device as claimed in claim 2, wherein the angle ranges from 10 to 80 degrees.

4. The display device as claimed in claim 3, wherein the angle ranges from 20 to 70 degrees.

5. The display device as claimed in claim 1, wherein the full ITO comprises a first block electrode.

6. The display device as claimed in claim 5, wherein the ratio of the area of the first block electrode to the area of the second pixel portion ranges from 0.6 to 0.98.

7. The display device as claimed in claim 1, wherein The full ITO comprises at least two second block electrodes, the two neighboring second block electrodes are connected, and the at least two second block electrodes are arranged in arrays.

8. A method using the display device as claimed in claim 1 for displaying images, comprising:
   transmitting the first scanning signal to the first switch through the first scan line to control the first current passage between the slit ITO and the data line to be turned on or turned off; and
   transmitting the second scanning signal to the second switch through the second scan line to control the second current passage between the full ITO and the data line to be turned on or turned off.

9. The method as claimed in claim 8, wherein the first switch turns on the first current passage when the display device is on a 2D mode to allow 2D image data to be transmitted to the slit ITO;
   the second switch turns off the second current passage when the display device is on the 2D mode to prevent the 2D image data from being transmitted to the full ITO.

10. The method as claimed in claim 8, wherein the first switch turns off the first current passage when the display device is on a 3D mode to prevent 3D image data from being transmitted to the slit ITO;
    the second switch is used for turns on the second current passage when the display device is on the 3D mode to allow the 3D image data to be transmitted to the full ITO.

11. A display device, comprising:
    a display panel, comprising a thin film transistor (TFT) array substrate, a color filter substrate, and a liquid crystal layer, wherein the TFT array substrate comprises:
    at least one pixel unit, the pixel unit comprising a first pixel portion and a second pixel portion, the first pixel portion comprising a first switch and a slit indium tin oxide (ITO), the first switch being connected to the slit ITO, the second pixel portion comprising a second switch and a full ITO, and the second switch being connected to the full ITO;
    at least one first scan line, the first scan line being connected to the first switch, the at least one first scan line being used for transmitting a first scanning signal to the first switch to control a first current passage between the slit ITO and a data line to be turned on or turned off; and
    at least one second scan line, the at least one second scan line being connected to the second switch, the second scan line being used for transmitting a second scanning signal to the second switch to control a second current passage between the full ITO and the data line to be turned on or turned off; and
    a lens plate, covering the display panel.

12. The display device as claimed in claim 11, wherein the first switch is used for turning on the first current passage when the display device is on a 2D mode to allow 2D image data to be transmitted to the slit ITO;
    the second switch is used for turning off the second current passage when the display device is on the 2D mode to prevent the 2D image data from being transmitted to the full ITO.

13. The display device as claimed in claim 11, wherein the first switch is used for turning off the first current passage when the display device is on a 3D mode to prevent 3D image data from being transmitted to the slit ITO;
    the second switch is used for turning on the second current passage when the display device is on the 3D mode to allow the 3D image data to be transmitted to the full ITO.

14. The display device as claimed in claim 11, wherein the lens plate comprises:
   a lens array, comprising at least two string-shaped lenses, the at least two string-shaped lenses being disposed in parallel, and a straight line formed by the string-shaped lenses and a line formed by the first pixel portion and the second pixel portion forming an angle.

15. The display device as claimed in claim 14, wherein the angle ranges from 10 to 80 degrees.

16. The display device as claimed in claim 15, wherein the angle ranges from 20 to 70 degrees.

17. The display device as claimed in claim 11, wherein the full ITO comprises a first block electrode.

18. The display device as claimed in claim 17, wherein the ratio of the area of the first block electrode to the area of the second pixel portion ranges from 0.6 to 0.98.

19. The display device as claimed in claim 11, wherein The full ITO comprises at least two second block electrodes, the two neighboring second block electrodes are connected, and the at least two second block electrodes are arranged in arrays.

\* \* \* \* \*